June 3, 1924.  
L. H. WILL  
NAME PLATE FOR FLOWER BOXES  
Filed Aug. 9, 1923
1,496,252
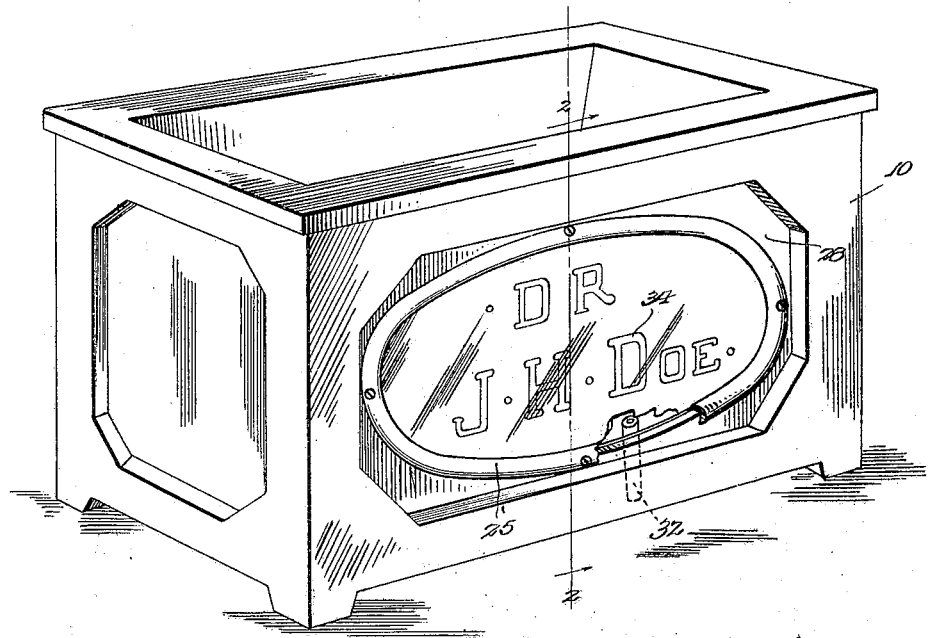
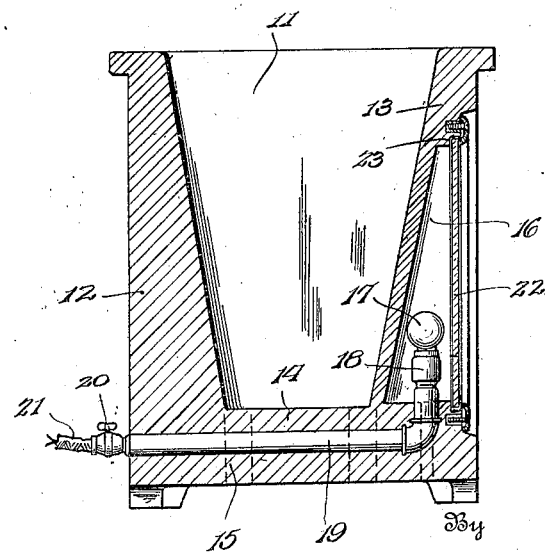
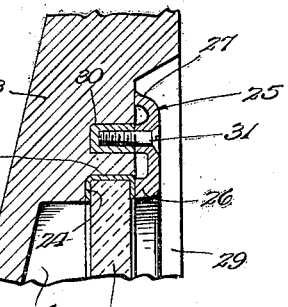
Inventor  
L. H. Will.  
By Lacey & Lacey, Attorneys Patented June 3, 1924.

1,496,252

UNITED STATES PATENT OFFICE.

LOUIS H. WILL, OF DETROIT, MICHIGAN.

NAME PLATE FOR FLOWER BOXES.

Application filed August 9, 1923. Serial No. 656,621.

*To all whom it may concern:*

Be it known that I, LOUIS H. WILL, a citizen of the United States, residing at Detroit, in the county of Wayne and State of Michigan, have invented certain new and useful Improvements in Name Plates for Flower Boxes, of which the following is a specification.

My invention relates to transparent name plates intended to be attached to flower boxes such as are used on porches of dwelling houses, and the main object of the invention is to provide an ornamental device which is adapted to be illuminated by a light behind the plate, so that the occupant's name can be seen at night.

In the accompanying drawing, one embodiment of the invention is illustrated; and Figure 1 shows a perspective view of a flower box with the name plate attached;

Figure 2 is a transverse section along line 2—2 of Figure 1; and

Figure 3 is a fragmentary section on an enlarged scale.

In the drawing reference numeral 10 represents a flower box such as is usually provided for porches or the like and which, as indicated in the drawing, is of rectangular shape and preferably made of concrete or other similar building material. This flower box has a large compartment 11 extending its entire length and opening at the top, and adapted for receiving the flowers. The walls 12 and 13, and bottom 14 are fairly thick, and the bottom is provided with drain passages 15.

The front wall 13 is recessed as at 16 and contains an electric bulb 17 suitably mounted on a support 18. From this support, a pipe 19 runs through the solid portion of the bottom horizontally to the rear of the flower box and terminates with a switch 20 for a cable 21 which connects the electric bulb with a source of electric power.

The open front of the recess 16 is covered by a piece of plate glass 22, the edges of which are covered by a U-shaped packing 23 preferably of rubber, and the glass 22 fits snugly with this packing in a rabbet 24 running along the open side of the recess 16, as best seen in Figure 3.

In order to hold the glass 22 securely in the rabbet, a frame 25 of the same contour as the edge of the glass engages the latter with its inner edge 26, while its outer edge 27 presses against the forward face 28 in a depressed portion 29 of the front wall 13. In the latter are cast metal sockets 30 which open outwardly and are threaded to receive securing screws 31, which engage in corresponding apertures provided in the frame 25.

At the bottom portion of the recess 16 is furnished a small pipe 32 forming a vent connecting the recess 16 with the open air.

When the switch 20 is turned on and the bulb 17 accordingly connected with the source of electric power, the light from the bulb is thrown forwardly in the recess 16 and shows through the transparent glass plate 22. If, now, the plate is provided with an inscription of some kind as, for instance, the name and title of a person, as indicated at 34 in Figure 1, this inscription can readily be read in the dark from in front of the flower box 10.

It is evident that the flower box may take any suitable shape and does not necessarily have to be rectangular or square, but may be cylindrical or of any other contour and carry whatever ornamentation is selected for the same.

Having thus described the invention, what is claimed as new is:

The combination with a flower receptacle having a depression in one wall and a recess in the wall at the rear of the depression, the sides of the recess being rabbeted at their junction with the bottom of the depression, a transparent name plate seated at its edges in the rabbeted portions of the sides of the recess, a lamp inserted in said recess, and a frame secured against the bottom of the depression with its inner edge projecting over the edge of the name plate.

In testimony whereof I affix my signature.

LOUIS H. WILL. [L. S.]